United States Patent Office 3,532,415
Patented Oct. 6, 1970

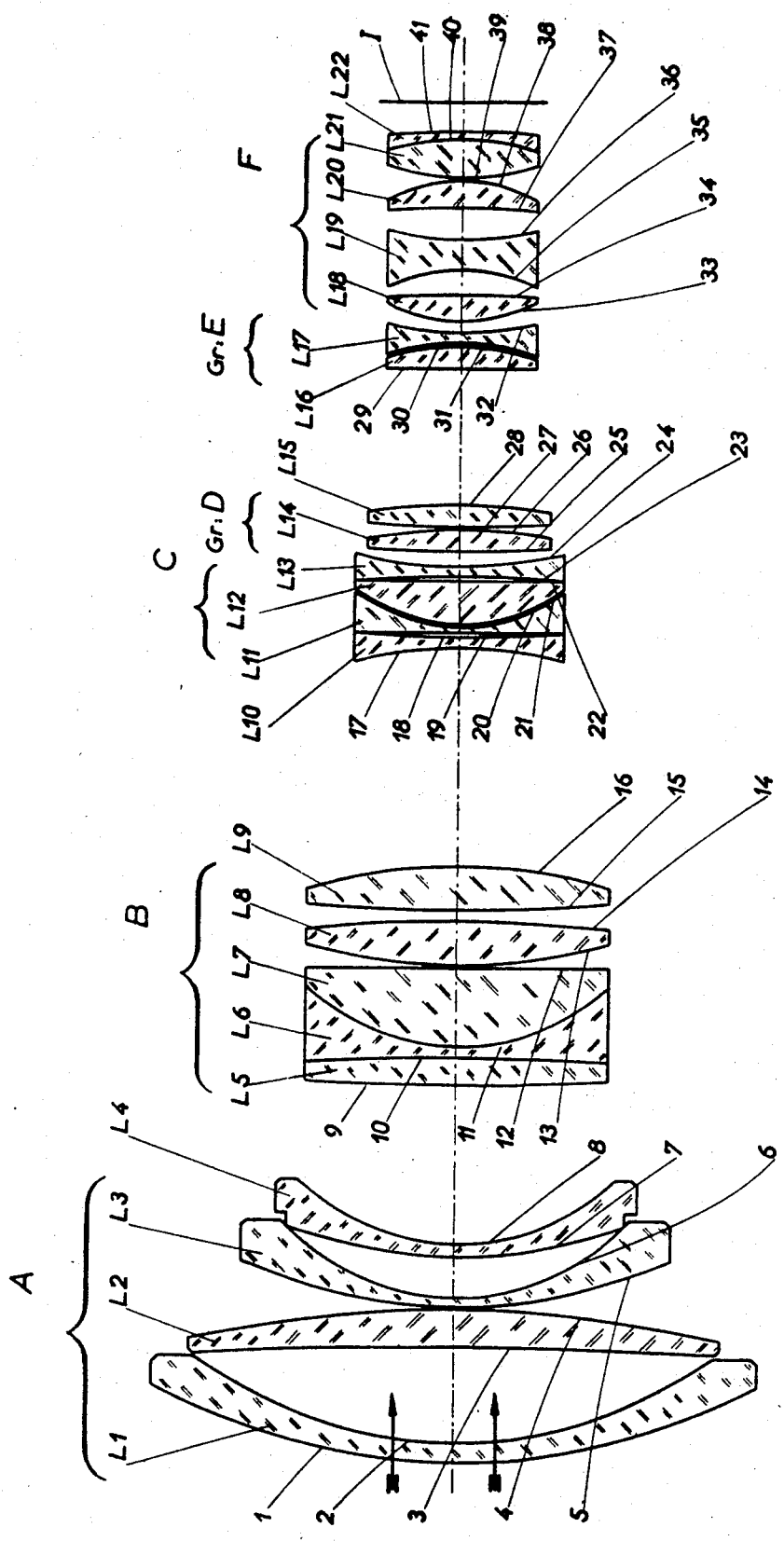

---

3,532,415
CINEMATOGRAPHIC TAKING LENS WITH VARIABLE FOCAL LENGTH
Jean Michel Baluteau, Livry-Gargan, and Raymond Rosier, Asnieres, France, assignors to Societe d'Optique Precision Electronique et Mecanique "Sopelem," Paris, France, a company of France
Filed Jan. 16, 1968, Ser. No. 698,329
Claims priority, application France, Jan. 27, 1967, 92,879
Int. Cl. G02b $15/14$
U.S. Cl. 350—186                 4 Claims

ABSTRACT OF THE DISCLOSURE

A taking lens comprising an afocal adjusting system with five units, respectively divergent, convergent, divergent, convergent and divergent, the second and fourth units having identical movements and the third unit having movements in the opposite direction, characterised in that the focal lengths $F_1$, $F_2$, $F_3$, $F_4$, $F_5$ of the five units and the focal length $F_6$ of a rear lens are such that:

$$-F_1 < F_2 < -1.10F_1$$
$$0.8F_1 < F_3 < 0.7F_1$$
$$-F_1 < F_4 < -1.10F_1$$
$$1.8F_1 < F_5 < 1.7F_1$$
$$-0.6F_1 < F_6 < -0.7F_1$$

Cinematographic lenses with variable focal length are known which can be used in average lighting conditions, these lenses being approximately F/1.6 and having an angle of view (corresponding to the short focal length) up to approximately 75°. These lenses can provide extreme focal length ratios of up to ten times.

Indoor shooting often requires a wide aperture combined with a wide angle of view, in which case the magnification ratio is lost.

The invention relates to a taking lens with variable focal length, having, by way of example, a 3× ratio between the extreme focal lengths, a geometric aperture of $f1.6$ and an angle of view of 75° with the short focal length. The range of focal lengths with such a lens can vary from 8 to 24 mm. for the 16 mm. format.

This lens comprises an afocal adjusting system followed by a rear lens for giving an image on a film, the adjusting system comprising, in the order of light propagation, a first, divergent unit for distance focusing, a second, convergent unit, a third, divergent unit, a fourth, convergent unit and a fifth, divergent unit, the second and fourth units having substantially identical movements and the third unit having movements in the opposite direction and substantially proportional to the movements of the second and fourth units, characterised in that the algebraic focal lengths $F_1$, $F_2$, $F_3$, $F_4$, $F_5$ respectively of the first, second, third, fourth and fifth units and the algebraic focal length $F_6$ of the rear lens are such that:

$$-F_1 < F_2 < -1.10F_1$$
$$0.8F_1 < F_3 < 0.7F_1$$
$$-F_1 < F_4 < -1.10F_1$$
$$1.8F_1 < F_5 < 1.7F_1$$
$$-0.6F_1 < F_6 < -0.7F_1$$

The invention will now be described in more detail with reference to a particular embodiment given by way of example and shown in the drawing.

The single figure is a longitudinal section through a variable focal-length lens embodying the invention, the light propagating from left to right.

This lens comprises an afocal adjusting system followed by a rear lens F giving the image on the film. The adjusting system comprises, in the order of light propagation: A fixed, divergent unit A, a movable, convergent unit B, a movable, divergent unit C, a movable, convergent unit D, and a fixed, divergent unit E.

The movable, convergent units B, D move in the same direction, simultaneously and to equal or substantially equal extents. At the same time, the divergent unit C moves in the opposite direction, by a distance proportional or substantially proportional to the movement of the units B, D.

The movable units B, D may be connected and the movements of the assembly comprising these units and the unit C may be produced by any known means, such as cams, slides or screws.

The magnification of the afocal system varies from 0.3 to 1. Also, if $F_1$, $F_2$, $F_3$, $F_4$, $F_5$ are the algebraic focal lengths of the units in the adjusting system and $F_6$ is the algebraic focal length of the rear lens, the following inequalities are found:

$$-F_1 < F_2 < -1.10F_1$$
$$0.8F_1 < F_3 < 0.7F_1$$
$$-F_1 < F_4 < -1.10F_1$$
$$1.8F_1 < F_5 < 1.7F_1$$
$$-0.6F_1 < F_6 < -0.7F_1$$

The invention is also characterised by the following constitution of each unit.

The divergent unit A comprises four single lens elements, the first lens element being a divergent meniscus convex towards the incident light, the second lens element a convergent meniscus concave towards the incident light, and the third and four lens elements divergent meniscuses convex towards the incident light.

In this unit the following inequalities are found:

$$-1.5R_1 < R_4 < -2.5R_1$$
$$0.3R_1 < R_6 < 0.4R_1$$
$$0.3R_1 < R_8 < 0.4R_1$$

R designating the radii of curvature and the indices designating, in sequence, the numbers of the surfaces encountered by the incident light.

All the lens elements in this unit are made of glass with a refractive index $n_d$ above 1.620.

The first and second lens elements in this unit form a substantially afocal assembly with a magnifiication of the order of 0.95, and serve to compensate distortion.

Focusing at short distances may be effected either by a movement of the four lens elements in the unit en bloc or—preferably—by a larger movement of the first three lens elements en bloc, the fourth lens element remaining stationary.

The convergent unit B comprises a very low-power hyperchromatic assembly with two or three lens elements, one of opposite sign from the others, cemented or separated by an air gap, followed by an assembly of two single lens elements of substantially equal powers.

In this unit, the following inequalities are found:

$$0.8R_1 < R_{13} < R_1$$
$$-0.8R_1 < R_{16} < -R_1$$

R and the indices signifying the same as before.

All the lens elements in this unit are made of glass with a refractive index $n_d > 1.620$.

The divergent unit C comprises two single, divergent lens elements of substantially equal power, enclosing a very low-power hyperchromatic assembly consisting of two lens elements of opposite powers, cemented or separated by an air gap.

In this unit, the following inequalities are found:

$$-0.65R_1 < R_{17} < -0.75R_1$$
$$0.65R_1 < R_{24} < 0.75R_1$$

R and the indices signifying the same as before.

All the lens elements in this unit are made of glass for which $n_d > 1.620$.

The convergent unit D comprises two single, convergent lens elements of substantially equal power, made of glass for which $n_d > 1.620$.

In this unit, the following inequalities are found:

$$0.8R_1 < R_{25} < 2.2R_1$$
$$-0.8R_1 < R_{28} < -2.2R_1$$

R and the indices signifying the same as before.

The divergent unit E comprises two lens elements of opposite powers, the first being positive and the second negative, cemented or separated by an air gap.

This unit is hyperchromatic; it is made of glass with a refractive index $n_d > 1.620$.

In this unit, the following inequalities are found:

$$-4R_1 < R_{29} < 4R_1$$
$$0.4R_1 < R_{32} < 0.8R_1$$

R and the indices signifying the same as before.

The convergent unit F forming the lens consists of three single lens elements followed by an achromatic unit. The first lens element is convergent, the second divergent, the third convergent. The rear unit is convergent and consists of tow lens elements of opposite power, which may or may not be cemented.

EXAMPLE

The characteristics of a lens embodying the invention, with a variable focal length of 8 to 24 mm. and f1.6 for the 16 mm. format, are given below.

In the following table, L designates a lens element and has an index corresponding to the number of the lens element in the sequence.

R is the radius of curvature of each face of a lens element and has an index corresponding to the number in the sequence of the face encountered by the incident light.

$e$ is the thickness of the glass.
E is the space between two successive lens elements.
$n_d$ is the refractive index.
V is the scattering factor.
$\phi$ is the diameter of each lens.
The distances are given in millimetres.

UNIT A

| L | R | e | $n_d$ | V | $\phi$ |
|---|---|---|---|---|---|
| L1 | $R_1 = +76.2$ $R_2 = +5$ | $e=2.2$ | $n_d=1.697$ | $V=56$ | $\phi=70$ |
| | | $E=11.1$ | | | |
| L2 | $R_3 = -740.8$ $R_4 = -145.5$ | $e=4.4$ | $n_d=1.697$ | $V=36$ | $\phi=61$ |
| | | $E=0.2$ | | | |
| L3 | $R_5 = +62.4$ $R_6 = +28.2$ | $e=1.4$ | $n_d=1.697$ | $V=56$ | $\phi=50$ |
| | | $E=4.6$ | | | |
| L4 | $R_7 = +55.7$ $R_8 = +26.8$ | $e=1.4$ | $n_d=1.697$ | $V=56$ | $\phi=40$ |
| | | E variable from 18.2 to 29.2 | | | |

UNIT B

| L | R | e | $n_d$ | V | $\phi$ |
|---|---|---|---|---|---|
| L5 | $R_9 = +435.6$ | $e=3$ | $n_d=1.788$ | $V=47$ | |
| L6 | $R_{10} = -463.4$ | $e=1.4$ | $n_d=1.788$ | $V=25$ | $\phi=34$ |
| L7 | $R_{11} = +26.6$ $R_{12} = \infty$ | $e=9.4$ | $n_d=1.744$ | $V=45$ | |
| | | $E=0.03$ | | | |
| L8 | $R_{13} = +65$ $R_{14} = -191.2$ | $e=5.1$ | $n_d=1.697$ | $V=56$ | $\phi=34$ |
| | | $E=1.3$ | | | |
| L9 | $R_{15} = +191.2$ $R_{16} = -65$ | $e=5.1$ | $n_d=1.697$ | $V=56$ | |
| | | E variable from 25.5 to 1.54 | | | |

UNIT C

| L | R | e | $n_d$ | V | $\phi$ |
|---|---|---|---|---|---|
| L10 | $R_{17} = -50$ $R_{18} = +170.6$ | $e=1.4$ | $n_d=1.697$ | $V=56$ | $\phi=23$ |
| | | $E=0.5$ | | | |
| L11 | $R_{19} = \infty$ $R_{20} = +20.1$ | $e=0.8$ | $n_d=1.788$ | $V=47$ | |
| | | $E=0.07$ | | | |
| L12 | $R_{21} = +20.1$ $R_{22} = \infty$ | $e=5.4$ | $n_d=1.788$ | $V=25$ | |
| | | $E=0.4$ | | | |
| L13 | $R_{23} = -170.6$ $R_{24} = +50$ | $e=1.4$ | $n_d=1.697$ | $V=56$ | $\phi=23$ |
| | E variable from 1.7 to 25.7 | | | | |

UNIT D

| L | R | e | $n_d$ | V | $\phi$ |
|---|---|---|---|---|---|
| L14 | $R_{25} = +159.4$ $R_{26} = -71.3$ | $e=2.6$ | $n_d=1.696$ | $V=31$ | |
| | | $E=0.02$ | | | $\phi=20$ |
| L15 | $R_{27} = +159.4$ $R_{28} = -71.3$ | $e=2.6$ | $n_d=1.696$ | $V=31$ | |
| | E variable from 15.7 to 4.7 Fixed diaphragm diameter 16.2 | | | | |

UNIT E AT 3,3 mm. OF THE DIAPHRAGM

| L | R | e | $n_d$ | V | $\phi$ |
|---|---|---|---|---|---|
| L16 | $R_{29} = +221.3$ $R_{30} = -30$ | $e=3.4$ | $n_d=1.788$ | $V=47$ | |
| | | $E=0.4$ | | | $\phi=16$ |
| L17 | $R_{31} = -30$ $R_{32} = +37.54$ | $e=1.3$ | $n_d=1.788$ | $V=25$ | |
| | | $E=1.4$ | | | |

UNIT F

| L | R | e | $n_d$ | V | $\phi$ |
|---|---|---|---|---|---|
| L18 | $R_{33} = +18.6$ $R_{34} = -528.5$ | $e=3.4$ | $n_d=1.720$ | $V=50$ | $\phi=16$ |
| | | $E=3.1$ | | | |
| L19 | $R_{35} = -19.45$ $R_{36} = +33.7$ | $e=3.4$ | $n_d=1.788$ | $V=25$ | $\phi=16$ |
| | | $E=3.8$ | | | |
| L20 | $R_{37} = -136.4$ $R_{38} = -18.8$ | $e=3.1$ | $n_d=1.720$ | $V=50$ | $\phi=15$ |
| | | $E=0.13$ | | | |
| L21 | $R_{39} = +27.5$ $R_{40} = -33.2$ | $e=4.4$ | $n_d=1.697$ | $V=56$ | $\phi=15$ |
| L22 | $R_{41} = -123.6$ | $e=1$ | $n_d=1.696$ | $V=31$ | |

The "tirage optique," i.e. the distance between the last lens element L22 and the film I, is equal to 16.1 mm.

What is claimed is:

1. A cinematographic taking lens with variable focal length comprising an afocal adjusting system followed by a rear lens for giving an image on a film, the adjusting system comprising, in the order of light propagation, a first divergent unit for distance focusing, a second convergent unit, a third divergent unit, a fourth convergent and a fifth divergent unit, the second and fourth units having substantially identical movements and the third unit having movements in the opposite direction and substantially proportional to the movements of the second and fourth units, the first divergent unit comprising four single lens elements, respectively, in the direction of light propagation, a divergent meniscus convex towards the incident light, a convergent meniscus concave towards the incident light and two divergent meniscuses convex toward the incident light, the second convergent unit comprising a very low power hyperchromatic assembly formed of two convergent lens elements enclosing a divergent lens element and the faces of these lens elements being substantially adjacent and a rear assembly of two biconvex lens elements of substantially equal power, the third unit comprising two divergent biconcave lens elements of substantially equal power enclosing a very low power hyperchromatic assembly formed from two substantially adjacent lens elements of opposite power and the fourth unit comprising two convergent biconvex lens elements of substantially equal power, the fifth unit comprising two substantially adjacent lens elements, the first being substantially biconvex and the second being biconcave in form, and the rear lens comprising two convergent assemblies, the first containing a convergent lens element, a divergent lens element, and a convergent lens element and the second containing two substantially adjacent lens elements of opposite power.

2. A lens as claimed in claim 1, characterised in that the magnification of the afocal adjusting system varies from 0.3 to 1.

3. A lens as claimed in claim 1, characterised in that the lens elements in the five units have an index $n_d > 1.620$.

4. A cinematographic taking lens with variable focal length comprising an afocal adjusting system followed by a rear lens for giving an image on a film, the adjusting system comprising, in the order of light propagation, a first divergent unit for distance focusing, a second convergent unit, a third divergent unit, a fourth convergent and a fifth divergent unit, the second and fourth units having substantially identical movements and the third unit having movements in the opposite direction and substantially proportional to the movements of the second and fourth units, the units having the following characteristics where L designates a lens element and has an index corresponding to the number of the lens element in the sequence, R is the radius of curvature of each face of a lens element and has an index corresponding to the number in the sequence of the face encountered by the incident light,
$e$ is the thickness of the glass,
E is the space between two successive lens elements,
$n_d$ is the refractive index,
V is the scattering factor,
$\phi$ is the diameter of each lens,
The distances are given in millimetres

UNIT 1

| | | | | | |
|---|---|---|---|---|---|
| L1 | $R_1=+76.2$ $R_2=+5.2$ | $e=2.2$ | $n_d=1.697$ | $V=56$ | $\phi=70$ |
| | | $E=11.1$ | | | |
| L2 | $R_3=-740.8$ $R_4=-145.5$ | $e=4.4$ | $n_d=1.697$ | $V=36$ | $\phi=61$ |
| | | $E=0.2$ | | | |
| L3 | $R_5=+62.4$ $R_6=+28.2$ | $e=1.4$ | $n_d=1.697$ | $V=56$ | $\phi=50$ |
| | | $E=4.6$ | | | |
| L4 | $R_7=+55.7$ $R_8=+26.8$ | $e=1.4$ | $n_d=1.697$ | $V=56$ | $\phi=40$ |
| | | E variable from 18.2 to 29.2 | | | |

UNIT 2

| | | | | | |
|---|---|---|---|---|---|
| L5 | $R_9=+435.6$ | $e=3$ | $n_d=1.788$ | $V=47$ | |
| L6 | $R_{10}=-463.4$ $R_{11}=+26.6$ | $e=1.4$ | $n_d=1.788$ | $V=25$ | $\phi=34$ |
| L7 | $R_{12}=\infty$ | $e=9.4$ | $n_d=1.744$ | $V=45$ | |
| | | $E=0.03$ | | | |
| L8 | $R_{13}=+65$ $R_{14}=-191.2$ | $e=5.1$ | $n_d=1.697$ | $V=56$ | $\phi=34$ |
| | | $E=1.3$ | | | |
| L9 | $R_{15}=+191.2$ $R_{16}=-65$ | $e=5.1$ | $n_d=1.697$ | $V=56$ | |
| | | E variable from 25.5 to 1.54 | | | |

UNIT 3

| | | | | | |
|---|---|---|---|---|---|
| L10 | $R_{17}=-50$ $R_{18}=+170.6$ | $e=1.4$ | $n_d=1.697$ | $V=56$ | $\phi=23$ |
| | | $E=0.5$ | | | |
| L11 | $R_{19}=\infty$ $R_{20}=+20.1$ | $e=0.8$ | $n_d=1.788$ | $V=47$ | |
| | | $E=0.07$ | | | |
| L12 | $R_{21}=+20.1$ $R_{22}=\infty$ | $e=5.4$ | $n_d=1.788$ | $V=25$ | |
| | | $E=0.4$ | | | |
| L13 | $R_{23}=-170.6$ $R_{24}=+50$ | $e=1.4$ | $n_d=1.697$ | $V=56$ | $\phi=23$ |
| | | E variable from 1.7 to 25.7 | | | |

UNIT 4

| | | | | | |
|---|---|---|---|---|---|
| L14 | $R_{25}=+159.4$ $R_{26}=-71.3$ | $e=2.6$ | $n_d=1.696$ | $V=31$ | |
| | | $E=0.02$ | | | $\phi=20$ |
| L15 | $R_{27}=+159.4$ $R_{28}=-71.3$ | $e=2.6$ | $n_d=1.696$ | $V=31$ | |
| | | E variable from 15.7 to 4.7 Fixed diaphragm diameter 16.2 | | | |

UNIT 5 AT 3,3 mm. OF THE DIAPHRAGM

| | | | | | |
|---|---|---|---|---|---|
| L16 | $R_{29}=+221.3$ $R_{30}=-30$ | $e=3.4$ | $n_d=1.788$ | $V=47$ | |
| | | $E=0.4$ | | | $\phi=16$ |
| L17 | $R_{31}=-30$ $R_{32}=+37.54$ | $e=1.3$ | $n_d=1.788$ | $V=25$ | |
| | | $E=1.4$ | | | |

UNIT 6

| | | | | | |
|---|---|---|---|---|---|
| L18 | $R_{33}=+18.6$ $R_{34}=-528.5$ | $e=3.4$ | $n_d=1.720$ | $V=50$ | $\phi=16$ |
| | | $E=3.1$ | | | |
| L19 | $R_{35}=-19.45$ $R_{36}=+33.7$ | $e=3.4$ | $n_d=1.788$ | $V=25$ | $\phi=16$ |
| | | $E=3.8$ | | | |
| L20 | $R_{37}=-136.4$ $R_{38}=-18.8$ | $e=3.1$ | $n_d=1.720$ | $V=50$ | $\phi=15$ |
| | | $E=0.13$ | | | |
| L21 | $R_{39}=+27.5$ $R_{40}=-33.2$ | $e=4.4$ | $n_d=1.697$ | $V=56$ | $\phi=15$ |
| L22 | $R_{41}=-123.6$ | $e=1$ | $n_d=1.696$ | $V=31$ | |

The distance between the lens element L22 and the film, being equal to 16.1 mm.

References Cited

UNITED STATES PATENTS 3,192,829  7/1965  Yamaji ----------- 350—186

JOHN K. CORBIN, Primary Examiner

U.S. Cl. X.R.

350—214

PO-1050
(5/69)

UNITED STATES PATENT OFFICE
CERTIFICATE OF CORRECTION

Patent No. 3,532,415    Dated October 6, 1970

Inventor(s) Jean Michel Baluteau and Raymond Rosier

It is certified that error appears in the above-identified patent and that said Letters Patent are hereby corrected as shown below:

Col. 3, line 25, "tow" should be --two--.
Col. 3, Unit A, "$R_2 = + 5$" should be --$R_2 = + 52.1$--.

Col. 5, Unit 1, line 45, "$R_2 = + 5.2$" should be --$R_2 = + 52.1$--.

SIGNED AND
SEALED
DEC 8 1970

(SEAL)
Attest:

Edward M. Fletcher, Jr.
Attesting Officer

WILLIAM E. SCHUYLER, JR.
Commissioner of Patents